(12) United States Patent
Song

(10) Patent No.: US 12,308,496 B2
(45) Date of Patent: May 20, 2025

(54) FUEL CELL POWER GENERATION FACILITY

(71) Applicants: Hyundai Motor Company, Seoul (KR); Kia Corporation, Seoul (KR)

(72) Inventor: Sung Weon Song, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 736 days.

(21) Appl. No.: 17/693,569

(22) Filed: Mar. 14, 2022

(65) Prior Publication Data
US 2023/0022187 A1 Jan. 26, 2023

(30) Foreign Application Priority Data
Jul. 21, 2021 (KR) .................. 10-2021-0096012

(51) Int. Cl.
*H01M 8/04701* (2016.01)
*H01M 8/04014* (2016.01)
*H01M 8/04029* (2016.01)
*H01M 8/2475* (2016.01)

(52) U.S. Cl.
CPC ..... *H01M 8/04738* (2013.01); *H01M 8/04014* (2013.01); *H01M 8/04029* (2013.01); *H01M 8/2475* (2013.01)

(58) Field of Classification Search
None
See application file for complete search history.

(56) References Cited

FOREIGN PATENT DOCUMENTS

KR 10-2010-0114686 A1 10/2010

*Primary Examiner* — Lucas J. O'Donnell
(74) *Attorney, Agent, or Firm* — Morgan, Lewis & Bockius LLP

(57) ABSTRACT

A fuel cell power generation facility is proposed. The fuel cell power generation facility is configured with a plurality of fuel cell power generation modules, each of the fuel cell power generation modules including a frame with a power module complete (PMC), an electric module, and a filter module installed therein, an electric module reservoir installed in the frame for cooling the electric module, an electric module cooling device installed in the frame and connected to the electric module reservoir, and an air guide configured to guide air discharged from the electric module cooling device toward radiation fins configured for cooling a junction box of the PMC.

15 Claims, 7 Drawing Sheets

FUEL CELL POWER GENERATION FACILITY

CROSS REFERENCE TO RELATED APPLICATION

The present application claims the benefit of priority to Korean Patent Application No. 10-2021-0096012, filed on Jul. 21, 2021 in the Korean Intellectual Property Office, the entire contents of which is incorporated herein by reference.

TECHNICAL FIELD

The present disclosure relates to a power generation facility using a fuel cell system.

BACKGROUND

A fuel cell vehicle is configured such that a fuel cell system is mounted on the vehicle, and a drive motor is driven by electricity generated in the fuel cell system to drive the vehicle.

The fuel cell system is equipped with a fuel cell stack and a power module complete (PMC), that is an integrated module for generating electric energy, including a fuel cell stack and a driving device, various filters, cooling parts, and electric parts.

As described above, a fuel cell system designed and manufactured to be mounted on a vehicle may be mounted on a vehicle, but may also be utilized as a configuration module of a power generation facility.

In particular, a fuel cell system that has already reached the end of its lifespan for a vehicle often retains power generation capability as a power generation facility.

Therefore, it would be desirable to utilize the fuel cell system as a configuration module of a power generation facility to fully utilize the remaining capacity of the fuel cell system.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made to provide a fuel cell power generation facility capable of configuring a cooling system more efficiently in order to maximize residual power generation capability of a fuel cell system by building the power generation facility using a plurality of vehicle fuel cell systems.

In order to achieve the above objective, according to an embodiment of the disclosure, a fuel cell power generation facility configured with a plurality of fuel cell power generation modules is disclosed herein. Each of the fuel cell power generation modules includes: a frame with a power module complete (PMC), an electric module, and a filter module installed therein; an electric module reservoir installed in the frame for cooling the electric module; an electric module cooling device installed in the frame to be connected to the electric reservoir; and an air guide configured to guide air discharged from the electric module cooling device toward radiation fins configured for cooling a junction box of the PMC.

The electric module cooling device mentioned above may be a radiator configured to circulate refrigerant of the electric module reservoir therein, and to be cooled by forced blowing of air.

The electric module cooling device may be mounted on one side of the frame to discharge air toward the junction box and the radiation fins disposed on one side of the stack of the PMC, and the air guide may have the shape of a flared pipe that collects the air blown from the electric module cooling device and concentrates the air on the radiation fins.

The junction box may be positioned on an upper side of the stack with the radiation fins interposed therebetween. The electric module cooling device may be mounted to discharge heat-exchanged air toward the junction box and the radiation fins on the upper side of the stack. The air guide may be positioned between the radiation fins and the electric module cooling device.

The radiation fins may be disposed on a cooling passage passing between the stack and the junction box. The air guide may be configured such that the cross section of the cooling passage gradually changes along the longitudinal direction of the cooling passage so as to collect and pass the air blown from the electric module cooling device through the cooling passage.

The fuel cell power generation module may be positioned adjacent to each other via the frame to have a first module and a second module, respectively. A stack reservoir for stack cooling may be installed in the frame of the first module. The stack reservoir is connected commonly both to the stack cooling circuit of the first module and to the stack cooling circuit of the second module.

The first module and the second module may consist of an upper module and a lower module, respectively, and be stacked up and down on each other.

The stack cooling circuit of the upper module and the stack cooling circuit of the lower module may be connected commonly to a single stack cooling system.

The stack cooling system may include a stack radiator that exchanges heat with the refrigerant of both the stack cooling circuit of the first module and the stack cooling circuit of the second module.

In addition, a fuel cell power generation module for a fuel cell power generation facility, as an embodiment of the present disclosure, includes: a frame with a power module complete (PMC), an electric module, and a filter module installed therein; an electric module reservoir installed in the frame; an electric module cooling device installed in the frame and connected to the electric module reservoir; and an air guide configured to guide air discharged from the electric module cooling device toward radiation fins configured for cooling the junction box of the PMC.

The electric module cooling device may be a radiator configured to circulate the refrigerant of the electric module reservoir therein, and to be cooled by forced blowing of air.

The electric module cooling device may be mounted on one side of the frame to discharge air toward the junction box and the radiation fins disposed on one side of the stack of the PMC. The air guide may have the shape of a flared pipe that collects air blown from the electric module cooling device and concentrates the air to the radiation fins.

The junction box may be positioned on an upper side of the stack with the radiation fins interposed therebetween. The electric module cooling device system may be mounted to discharge heat-exchanged air toward the junction box and the radiation fins on the upper side of the stack. The air guide may be positioned between the radiation fins and the electric module cooling device.

The radiation fins may be disposed on a cooling passage passing between the stack and the junction box, and the air guide may be configured such that the cross section of the cooling passage gradually changes along the longitudinal direction of the cooling passage in order to collect and pass the air blown from the electric module cooling device through the cooling passage.

The frame may further include a stack reservoir for stack cooling. The stack reservoir may be connected to a stack cooling circuit for cooling the stack of PMC accommodated in the frame disposed with the stack reservoir, and may be connected to another external stack cooling circuit.

According to an exemplary embodiment of the present disclosure, a power generation facility can be configured by integrating a fuel cell power generation module using a fuel cell system for a vehicle. Consequently, a remaining power generation capability of a fuel cell system may be maximally utilized, and the power generation facilities from small to large may be easily and efficiently expanded and built by combining a plurality of fuel cell power generation modules.

In addition, in the event of a power generation facility construction, an efficient cooling system is provided and suitable for a stacked arrangement of a plurality of fuel cell power generation modules, thereby minimizing the number of necessary parts and ensuring sufficient cooling performance as required.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
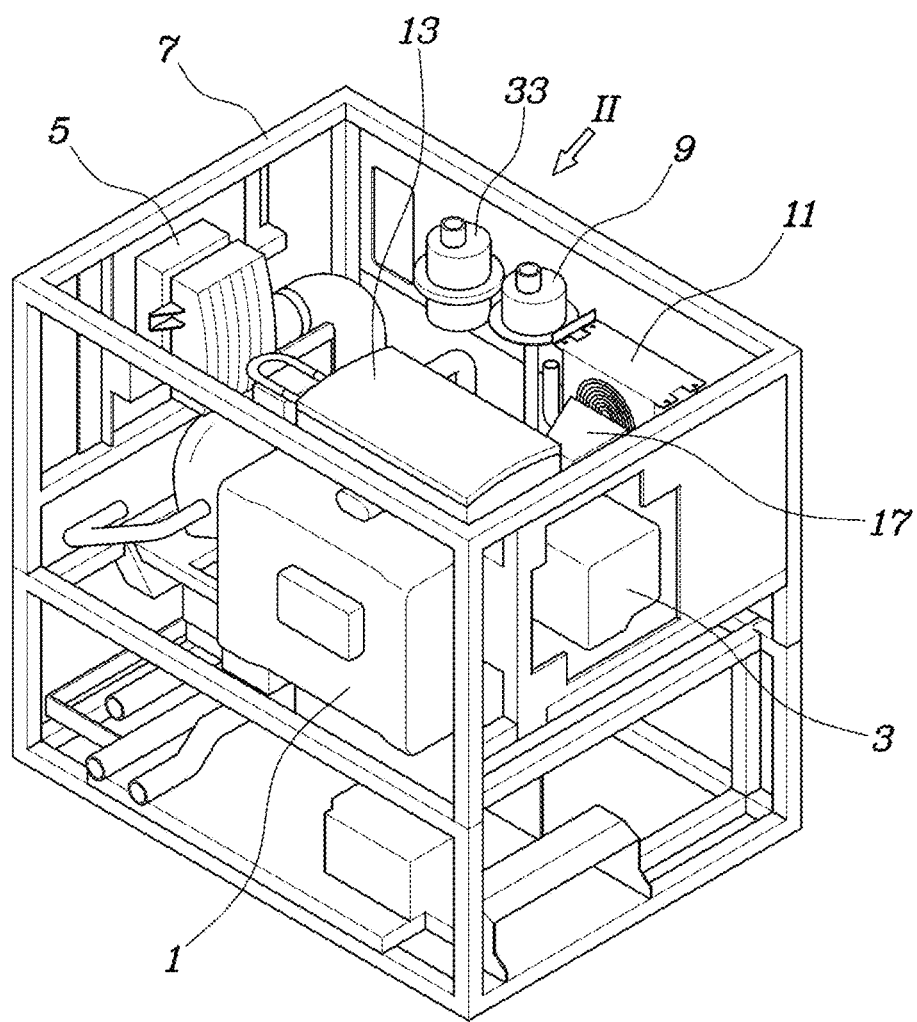
FIG. 1 is a view showing a fuel cell power generation module according to an exemplary embodiment of the present disclosure.
Figure 2:
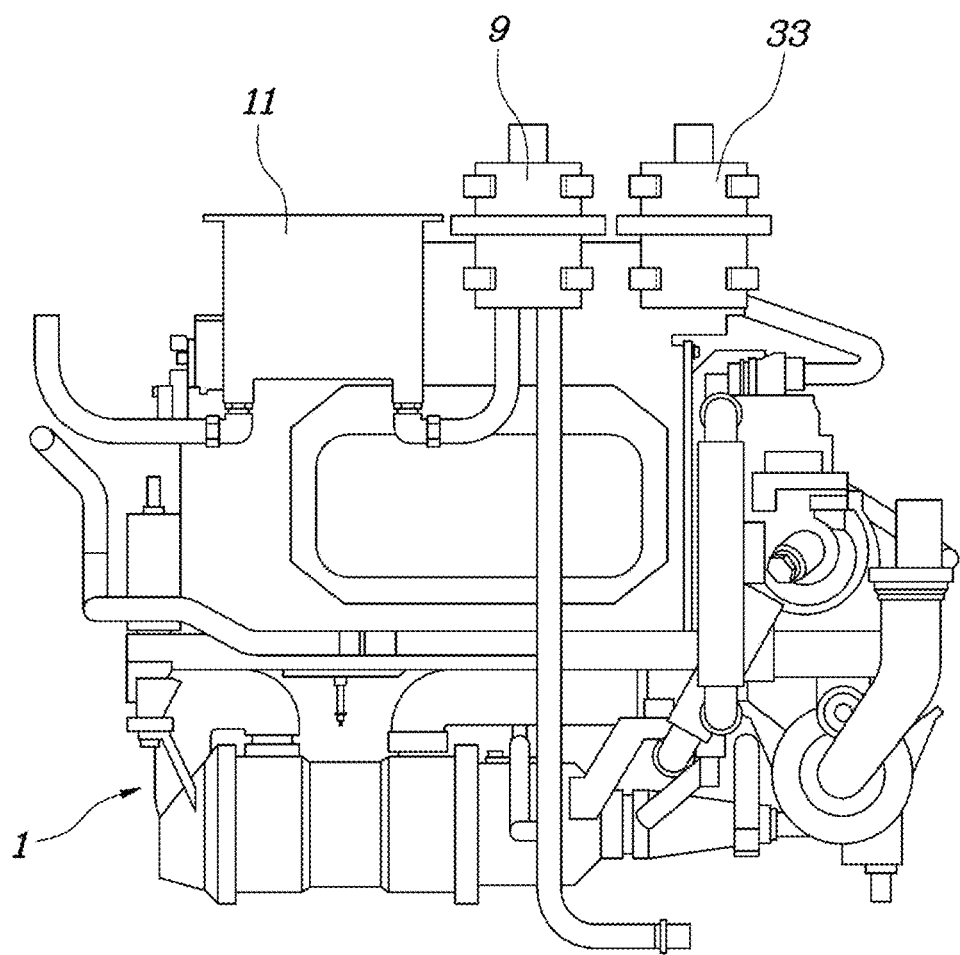
FIG. 2 is a view showing a connection structure of an electric module cooling device and an electric module reservoir, as viewed in the direction II of FIG. 1.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be construed in the same manner.

The terminology used herein is for the purpose of describing particular embodiments only and is not intended to limit the present disclosure. Singular forms are intended to include plural forms unless the context clearly indicates otherwise. It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

Hereinbelow, preferred embodiments of the present disclosure will be described in detail with reference to accompanying drawings. Like reference numerals given in the drawings indicate like components.

Referring to FIGS. 1 to 4, each fuel cell power generation module constituting the fuel cell power generation facility according to an exemplary embodiment of the present disclosure includes: a frame 7 with a power module complete (PMC) 1 and an electric module 3, and a filter module 5 installed therein; an electric module reservoir 9 installed in the frame 7 for cooling the electric module 3; a cooling device 11 for electric instrument, the cooling device being installed in the frame 7 so as to be connected to the electric module reservoir 9; and an air guide 17 configured to guide the air discharged from the electric module cooling device 11 toward the radiation fins 15 configured for cooling the junction box 13 of the PMC 1.

In other words, the fuel cell power generation module includes the PMC 1, the electric module 3, and the filter module 5 which are disposed in the frame 7, and the electric module cooling device 11 and the air guide 17 both being disposed to constitute a cooling system.

Figure 5:
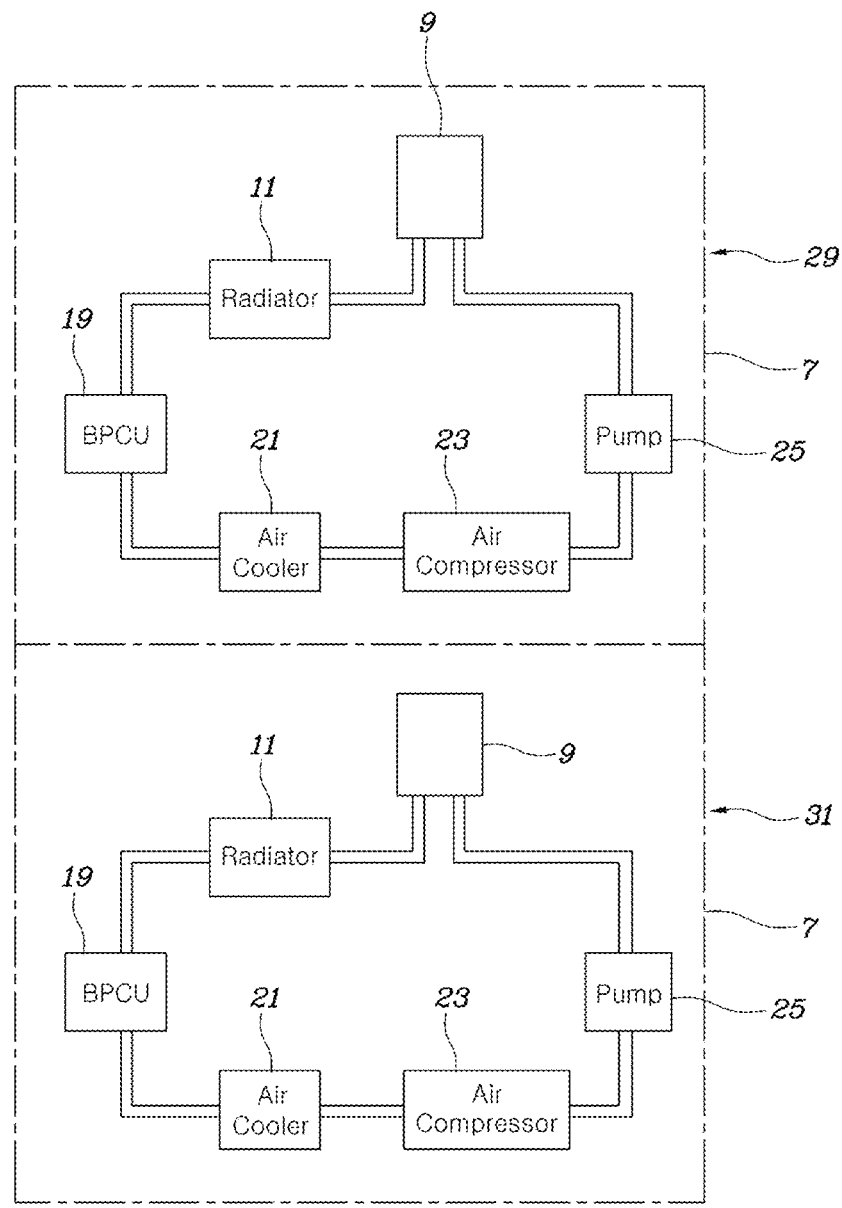
FIG. 5 is a view showing an electronic cooling circuit of an upper module and a lower module constituting a fuel cell power generation facility according to an exemplary embodiment of the present disclosure.

A refrigerant for cooling the electric module 3 is stored certainly in the electric module reservoir 9. The refrigerant is cooled in the electric module cooling device 11 as shown in FIG. 5, and is circulated through a BPCU (blower power control unit) 19, an air cooler 21, an air compressor 23, and a pump 25 for pumping the refrigerant, which constitute the electric module 3.

The electric module cooling device 11 may be a radiator configured to circulate the refrigerant of the electric module reservoir 9 therein, and to be cooled by forced blowing of air. Of course, the electric module cooling device 11 may be composed of other various types of heat exchangers or coolers instead of the radiator type.

The electric module cooling device 11 is mounted on one side of the frame 7 to discharge air toward the junction box 13 and the radiation fins 15 disposed on the upper side of the stack 27 of the PMC 1. The air guide 17 is configured in a shape of a flared pipe that collects the air blown from the electric module cooling device 11 and concentrates the air on the radiation fins 15.

That is, the air forcibly blown into the atmosphere to cool the refrigerant in the cooling device 11 is collected through the air guide 17 as described above and supplied to the radiation fins 15, so that cooling of the radiation fins 15 can be made more smoothly.

Figure 3:
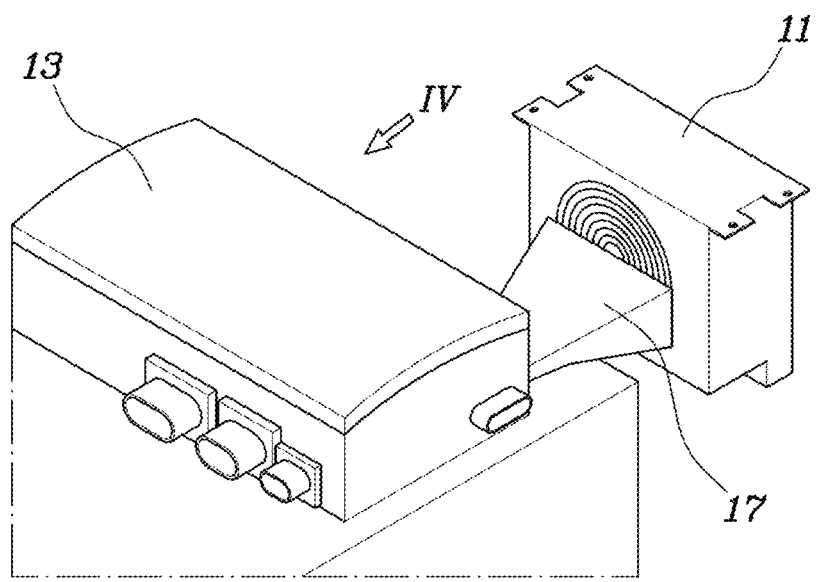
FIG. 3 is a view showing in detail the electric module cooling device and the air guide of FIG. 1.
Figure 4:
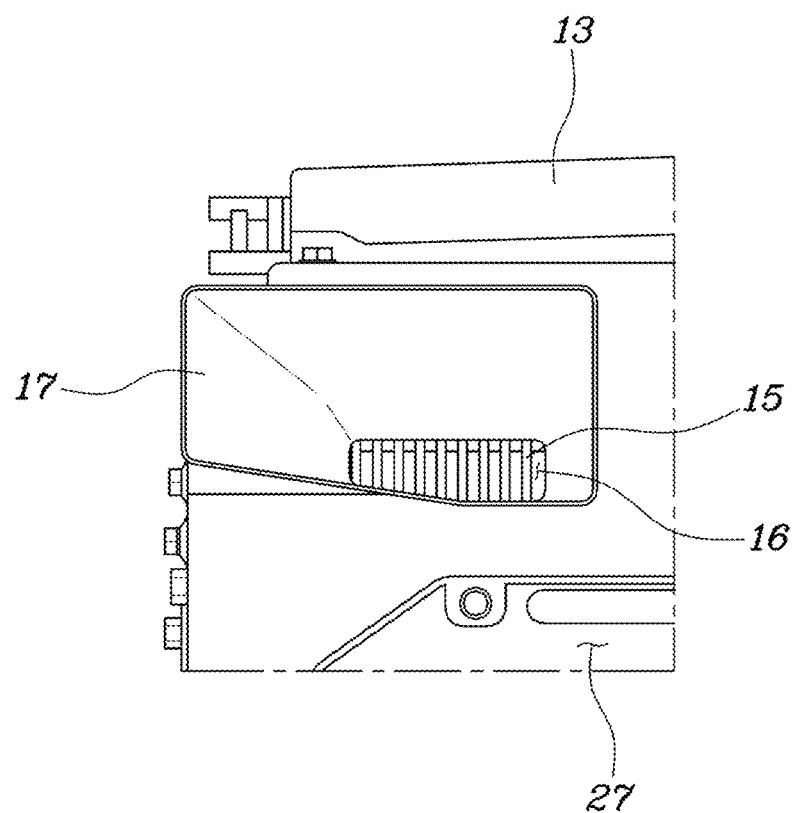
FIG. 4 is a view showing the air guide and the radiation fins observed in the direction IV of FIG. 3.

Therefore, when air is supplied toward the radiation fins through the air guide 17, forced air cooling of the radiation fins 15 is achieved, being discharged from the side of the air guide 17 of FIG. 3 to the opposite side.

Further, as an exemplary embodiment of the present disclosure, a fuel cell power generation facility may be configured by integrating a plurality of fuel cell power generation modules arranged as described above.

Figure 6:
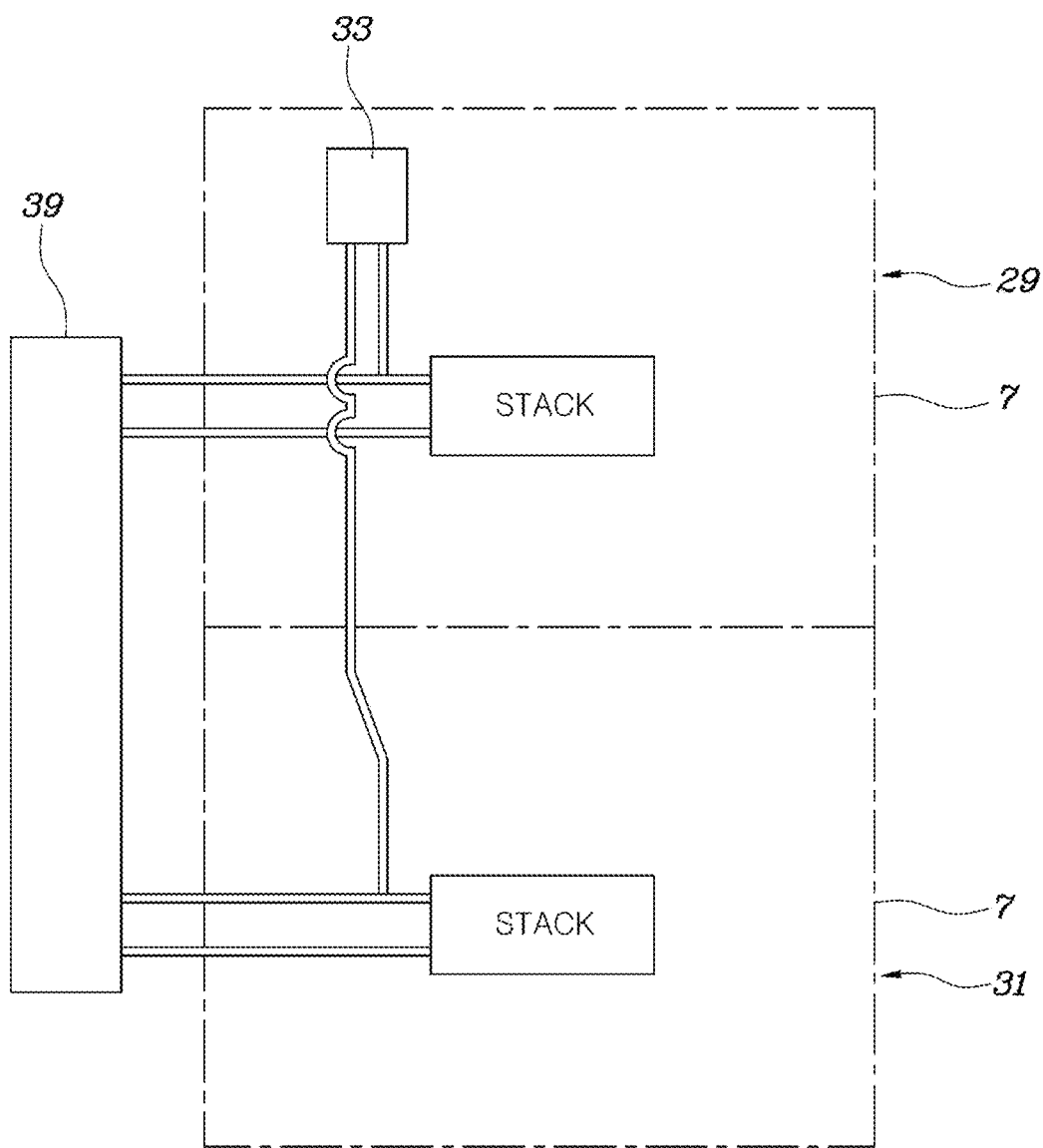
FIG. 6 is a view showing a stack cooling circuit of an upper module and a lower module constituting a fuel cell power generation facility according to an exemplary embodiment of the present disclosure.
Figure 7:
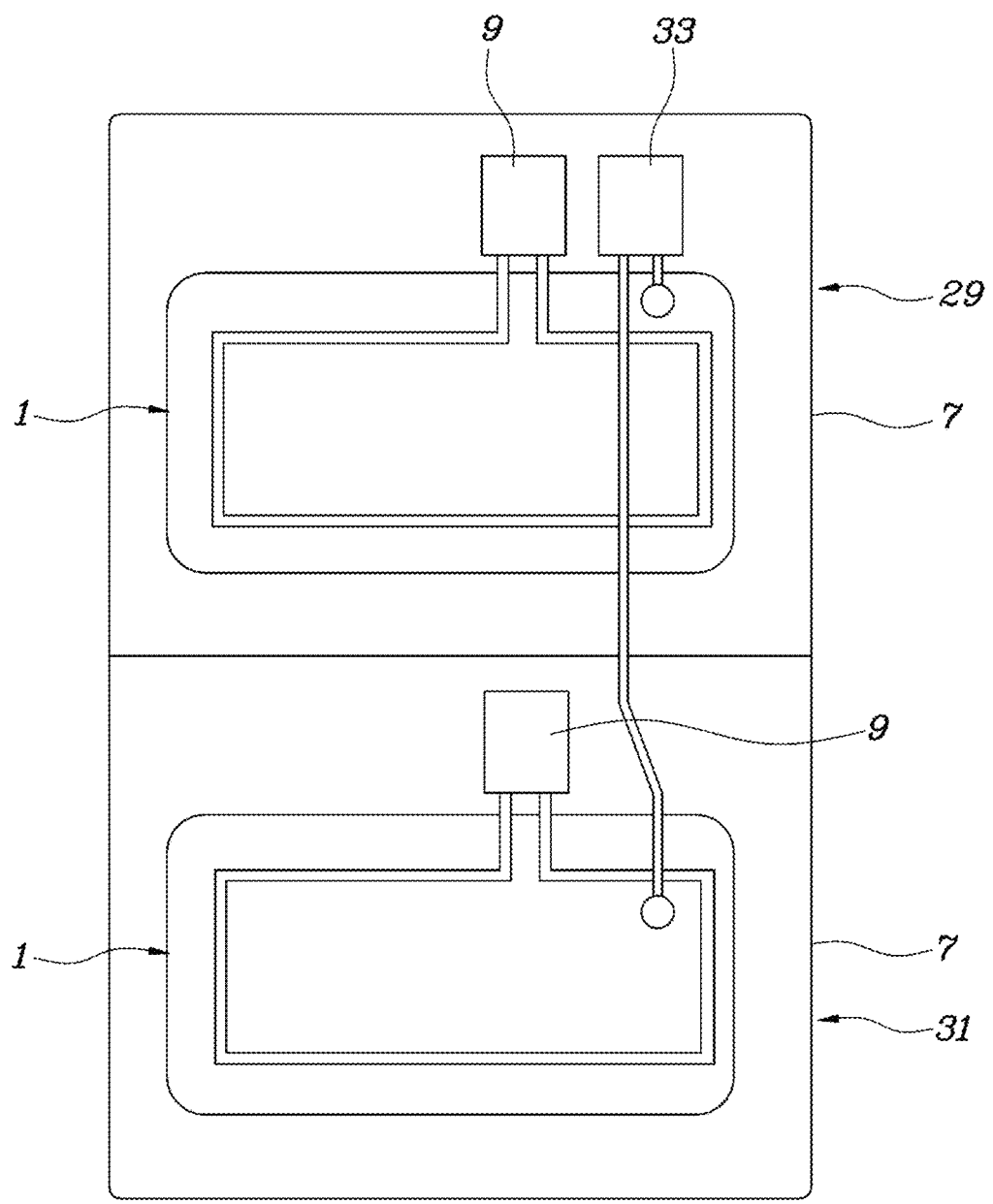
FIG. 7 is a view showing a connection structure both of an electric module reservoir and a stack reservoir of an upper module and a lower module constituting a fuel cell power generation facility according to an exemplary embodiment of the present disclosure.

In other words, as shown in FIGS. 5 to 7, the fuel cell power generation modules may be stacked up and down to configure a fuel cell power generation facility of an exemplary embodiment of the present disclosure. Certainly, the battery power generation modules may be more integrated adjacent to each other to constitute a large power generation facility, as illustrated in FIGS. 5 to 7.

Referring to FIGS. 5 to 7, the fuel cell power generation modules are positioned adjacent to each other via the frame 7 to have a first module 29 and a second module 31, respectively. The stack reservoir 33 is configured to be commonly connected with both a stack cooling circuit of the first module 29 and a stack cooling circuit 37 of the second module 31.

In other words, the frame 7 of the first module 29 is further disposed with a stack reservoir 33 for cooling the stack. This stack reservoir 33 is connected to a stack cooling circuit for cooling the stack of the PMC 1 accommodated in the frame 7, in which the stack reservoir 33 is equipped, and this stack reservoir 33 is also connected to another external stack cooling circuit.

Therefore, the second module 31 is not equipped with a separate stack reservoir 33, but uses the same stack reservoir 33 disposed in the first module 29 to receive the required refrigerant.

For reference, in this embodiment, the first module 29 and the second module 31 are each composed as an upper module and a lower module respectively, and are stacked vertically.

In addition, referring to FIG. 6, a stack cooling circuit of the first module 29 and a stack cooling circuit 37 of the second module 31 are connected commonly to a single stack cooling device 39.

The stack cooling device 39 requires a relatively large cooling capacity, and may be installed as a separate configuration outside vertically stacked fuel cell power generation modules as illustrated in FIG. 6.

In other words, in the fuel cell power generation facility of an exemplary embodiment of the present disclosure, the electric module reservoir 9 and the electric module cooling device 11 are installed individually for each fuel cell power generation module to constitute an individual electric vehicle cooling circuit, whereas the stack reservoir 33 and the stack cooling device 39 are installed commonly to the fuel cell power generation modules arranged vertically, so that the number of elements required can be reduced while sufficiently providing the required cooling capacity.

For reference, FIG. 7 shows together a connection structure of an electronic reservoir 9 and a stack reservoir 33 of a first module 29 and of a second module 31, constituting the fuel cell power generation facility of the present disclosure, and only the commonly connected stack reservoir 33 is described whereas a stack cooling circuit and a stack cooling device 39 in each of the stack are omitted.

In addition, the stack cooling device 39 may include a stack radiator that exchanges heat with the refrigerant of both a stack cooling circuit of the first module 29 and a stack cooling circuit of the second module 31.

Of course, the stack cooling device 39 may also be configured with various types of heat exchangers or cooling towers.

Although the preferred embodiments of the present disclosure have been disclosed for illustrative purposes, those skilled in the art will appreciate that various modifications, additions and substitutions are possible, without departing from the spirit and scope of the present disclosure.

What is claimed is:

1. A fuel cell power generation facility comprising a plurality of fuel cell power generation modules, wherein each of the plurality of fuel cell power generation modules comprises:
 a frame having a power module complete (PMC), an electric module, and a filter module installed therein;
 an electric module reservoir installed in the frame for cooling the electric module;
 an electric module cooling device installed in the frame and connected to the electric module reservoir; and
 an air guide configured to guide air discharged from the electric module cooling device toward radiation fins configured for cooling a junction box of the PMC.

2. The fuel cell power generation facility of claim 1, wherein the electric module cooling device comprises an electric module radiator configured to circulate refrigerant of the electric module reservoir therein, and to be cooled by forced blowing of air.

3. The fuel cell power generation facility of claim 1, wherein the electric module cooling device is mounted on one side of the frame to discharge air toward the junction box and the radiation fins, which are disposed on one side of a stack of the PMC, and
 the air guide has a shape of a flared pipe that collects air blown from the electric module cooling device and concentrates the air on the radiation fins.

4. The fuel cell power generation facility of claim 1, wherein the junction box is positioned on an upper side of a stack of the PMC with the radiation fins interposed therebetween,
the electric module cooling device is mounted to discharge heat-exchanged air toward the junction box and the radiation fins which are disposed on the upper side of the stack, and
the air guide is positioned between the radiation fins and the electric module cooling device.

5. The fuel cell power generation facility of claim 1, wherein the radiation fins are disposed on a cooling passage passing between a stack of the PMC and the junction box, and
the air guide is configured such that a cross section of the cooling passage gradually changes along a longitudinal direction of the cooling passage thus to collect and pass air blown from the electric module cooling device through the cooling passage.

6. The fuel cell power generation facility of claim 1, wherein the plurality of fuel cell power generation modules are positioned adjacent to each other via the frame to have a first module and a second module, respectively,
a stack reservoir configured for stack cooling is installed in the frame of the first module, and
the stack reservoir is connected commonly both to a stack cooling circuit of the first module and to a stack cooling circuit of the second module.

7. The fuel cell power generation facility of claim 6, wherein each of the first module and the second module constitutes an upper module and a lower module, respectively, and is stacked up and down on each other.

8. The fuel cell power generation facility of claim 7, wherein the stack cooling circuit of the first module and the stack cooling circuit of the second module are commonly connected to a same stack cooling system.

9. The fuel cell power generation facility of claim 8, wherein the stack cooling system includes a stack radiator that exchanges heat with refrigerant of both the stack cooling circuit of the first module and the stack cooling circuit of the second module.

10. A fuel cell power generation module for a fuel cell power generation facility, the fuel cell power generation module comprising:
a frame having with a power module complete (PMC), an electric module, and a filter module installed therein;
an electric module reservoir installed in the frame;
an electric module cooling device installed in the frame and connected to the electric module reservoir; and
an air guide configured to guide air discharged from the electric module cooling device toward radiation fins configured for cooling a junction box of the PMC.

11. The fuel cell power generation module of claim 10, wherein the electric module cooling device comprises a radiator configured to circulate refrigerant of the electric module reservoir therein, and to be cooled by forced blowing of air.

12. The fuel cell power generation module of claim 10, wherein the electric module cooling device is mounted on one side of the frame to discharge air toward the junction box and the radiation fins which are configured on one side of a stack of the PMC, and
the air guide has a shape of a flared pipe that collects air blown from the electric module cooling device and concentrates the air on the radiation fins.

13. The fuel cell power generation module of claim 10, wherein the junction box is positioned on an upper side of a stack of the PMC with the radiation fins interposed therebetween,
the electric module cooling device is mounted to discharge heat-exchanged air toward the junction box and the radiation fins which are configured on the upper side of the stack, and
the air guide is positioned between the radiation fins and the electric module cooling device.

14. The fuel cell power generation module of claim 10, wherein the radiation fins extend along a cooling passage passing between a stack of the PMC and the junction box, and
the air guide is configured such that a cross section of the cooling passage gradually changes along a longitudinal direction of the cooling passage so as to collect and pass the air blown from the electric module cooling device through the cooling passage.

15. The fuel cell power generation module of claim 10, wherein the frame further comprises a stack reservoir configured for stack cooling, and
the stack reservoir is connected to a stack cooling circuit configured for cooling a stack of the PMC accommodated in the frame disposed with the stack reservoir, and is configured to be connected to another external stack cooling circuit as well.

* * * * *